(12) United States Patent
Weiler et al.

(10) Patent No.: US 6,857,160 B2
(45) Date of Patent: Feb. 22, 2005

(54) WINDSHIELD WIPER DEVICE

(75) Inventors: Michael Weiler, Karlsruhe (DE); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/391,996

(22) Filed: Mar. 19, 2003

(65) Prior Publication Data

US 2003/0233724 A1 Dec. 25, 2003

(30) Foreign Application Priority Data

Jun. 21, 2002 (DE) .......................................... 102 27 781

(51) Int. Cl.[7] .............................. B60S 1/34; B60S 1/32
(52) U.S. Cl. ............................. 15/250.351; 15/250.19
(58) Field of Search ...................... 15/250.351, 250.352, 15/250.19, 250.34, 250.21, 250.04, 250.23, 250.202

(56) References Cited

U.S. PATENT DOCUMENTS

| | | | | |
|---|---|---|---|---|
| 3,623,183 A | * | 11/1971 | Wilfert et al. | ......... 15/250.351 |
| 3,670,356 A | * | 6/1972 | Sakamoto | .............. 15/250.351 |
| 4,581,786 A | * | 4/1986 | Brummer et al. | ....... 15/250.201 |
| 4,864,678 A | * | 9/1989 | Stevens | ................... 15/250.34 |

FOREIGN PATENT DOCUMENTS

| | | | |
|---|---|---|---|
| DE | 19651856 | * | 6/1998 |
| DE | 10052616 | * | 5/2002 |
| EP | 0299708 | * | 1/1989 |
| FR | 2515121 | * | 4/1983 |

* cited by examiner

*Primary Examiner*—Gary K. Graham
(74) *Attorney, Agent, or Firm*—Michael J. Striker (57) ABSTRACT

A windshield wiper device, in particular for a motor vehicle, includes a wiper arm (10) that is drivable by a drive, the wiper arm (10) being foldable onto the windshield and able to be folded away from the windshield. The wiper arm is associated with a wiper blade, whereby the wiper arm (10) has a region (11) that faces toward the drive and a region (12) that faces toward the wiper blade. Both regions are connected to two torsion spring elements (13, 14). The torsion spring element (13, 14) are provided with two opposite torsion angles. The torsion spring elements (13, 14) have a square cross section, whose width is greater than its thickness, so that the torsion spring elements (13, 14) are curved in a longitudinal direction toward the windshield or curved away from the windshield.

10 Claims, 8 Drawing Sheets

WINDSHIELD WIPER DEVICE

BACKGROUND OF THE INVENTION

The present invention relates to a windshield wiper device, in particular, for a motor vehicle, with a wiper arm that is drivable by a drive, and in which the wiper arm is collapsible on the windshield and is able to be folded away from the windshield. A wiper blade is disposed on the wiper arm, whereby the wiper arm hate a region facing the drive and a region facing the wiper blade.

The windshield wiper devices known to this point have a wiper arm, which by means of a hinge or joint, is able to be swung away from the windshield and which is collapsible onto the windshield. So that the wiper arm in a folded state on the windshield is as securely pressed as possible against the windshield, and the wiper arm in the state of being folded out from the windshield stably remains in place, the known wiper arms have a tension spring. It is disadvantageous with these conventional wiper arms that this requires a known assembly expenditure, which therefore increases the costs of the windshield wiper device. In addition, the wiper arms of the known windshield wiper devices, when in the state of being folded or collapsed onto the window pane, have a relatively large distance to the windshield, on account of which the wiper arms from that time in the switched-off or non-operative state of the wiper device can be poorly lowered invisibly.

The present invention addresses the problem of improving a windshield wiper device of the above-described type, such that the number of components required for the wiper arm is reduced.

SUMMARY OF THE INVENTION

The invention resolves the above problem with a windshield wiper device of the above-described type, which is characterized according to the present invention in that the region of the wiper arm facing toward the drive and the region of the wiper arm facing toward the wiper blade are connected with two torsion spring elements, whereby the torsion spring elements are provided with opposed torsion angles and the torsion spring elements have a square cross section, whose width is greater than its thickness, so that the torsion spring elements are curved toward the windshield or curved away from the windshield. In this manner, the number of components required in the future for the wiper arm is reduced to a minimum. The wiper arm has only the region facing toward the drive and the region facing toward the wiper blade, as well as the two torsion spring elements. The previously required hinge or joint for swinging away of the wiper arm from the pane, or for folding or collapsing the wiper arm on the pane, can there eliminated, as can the previously required tension spring. A wearing of the wiper arm over the course of time by folding in and out of the wiper arm onto and away from the pane is impossible in the future, since the joint friction was eliminated. The assembly expense of the wiper arm is thereby reduced to only a few assembly steps, which allow a very cost-effective automation with the simplest means. In addition, the wiper arm of the inventive windshield wiper device enables a relatively flat structure, so that it can also be lowered to be invisible, for example, in the A-support of a motor vehicle, whereby the entire aesthetic impression of the motor vehicle is reassessed.

If the two torsion spring elements are spaced from one another, the wiper blade is pressed optimally against the pane when in the folded-in state on the pane, and in the folded-out state from the pane, the wiper arm is held away from the pane with a maximum holding force.

The two torsion spring elements can be connected to one another on their end regions, respectively, by means of a connecting element, so that the torsion spring elements and the connecting elements form a single spring element, whereby the number of components required for the wiper arm, and therewith, the assembly steps to its manufacture can be reduced even further.

A connecting element of the individual spring element can be formed of one-piece and the other connecting element can be formed in two pieces. In this manner, the two torsion spring elements can be arranged with their one end V-shaped on the one-piece connecting element and, respectively, a part of the two-piece connecting element is mounted an the other end of one of the torsion spring elements. With this constructive structure of the torsion spring elements and the connecting elements, it is not necessary that the torsion spring elements, which produce the contact pressure of the wiper arm on the pane in the folded-in state of the wiper arm and in the folded-out state of the wiper arm, stabilize the position of the wiper arm, must be arced. The torsion of the torsion spring elements with this constructive form is achieved by counter-pressure of the torsion spring elements running in a V-shape from one another, since the width of the torsion spring elements is greater than their width. The torsion spring elements naturally have the tendency to bend in the direction of the least resistance moment. The torsion spring elements have the smallest resistance moment over their thickness, so that they bend about their thickness center-line, which corresponds to a bending line in the longitudinal direction of the torsion spring elements, when one presses them against one another transverse to their thickness.

When the two-piece connecting element has attachment means, the ends of the torsion spring elements running in a V-shape from one another can be held together without great expense, as these are pressed against one another.

When a connecting element is provided with a shoulder in its center region, the opposed torsion angles can be very simply manufactured according to finishing technique by production of the shoulder.

Likewise, it is very cost-effective if the torsion spring elements and/or the spring element is manufactured as a stamped metal part or alternatively, as a fiber-reinforced plastic part.

The connecting elements of the spring element can be formed as one piece, and the spring element can be manufactured as a longitudinally bent component with torsion spring elements (41, 42) arced about their longitudinal axis. A spring element with these features can be made, for example, in a stamp press as a stamped bent part in one machining step.

If the region of the wiper arm facing the drive and the region of the wiper arm facing the wiper blade each have an opening for mounting the spring element, or these areas each are provided with two openings for mounting the two torsion spring elements, the entire wiper arm be quickly mounted by simply assembling the spring element with the region facing the drive and the region facing the wiper blade, or by simply assembling the torsion spring elements with the region facing the drive and the region facing the wiper blade.

In order to prevent slipping out of the spring element or the torsion spring elements from the mounting openings of the region facing the drive and the region facing the wiper blade, the spring element or the torsion spring elements can be engaged in the openings for mounting of the spring element or the torsion spring elements in the region facing the drive and/or in the region facing the wiper blade.

DETAILED DESCRIPTION OF THE PREFERRED EMBODIMENTS

Figure 1A:
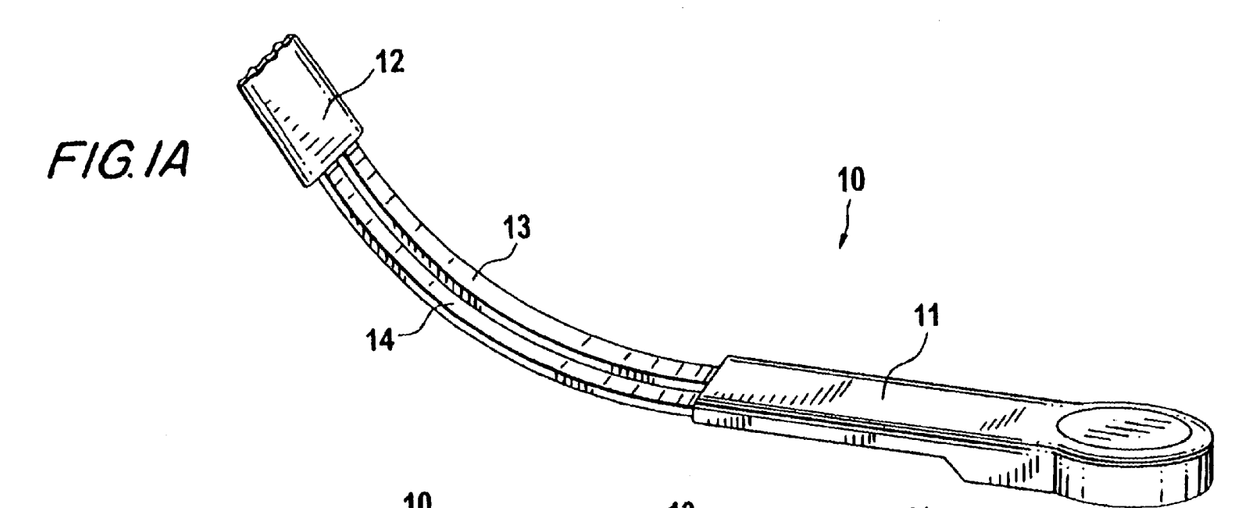
FIG. 1A shows a perspective view of a wiper arm folded out and away from the windshield.
Figure 1B:
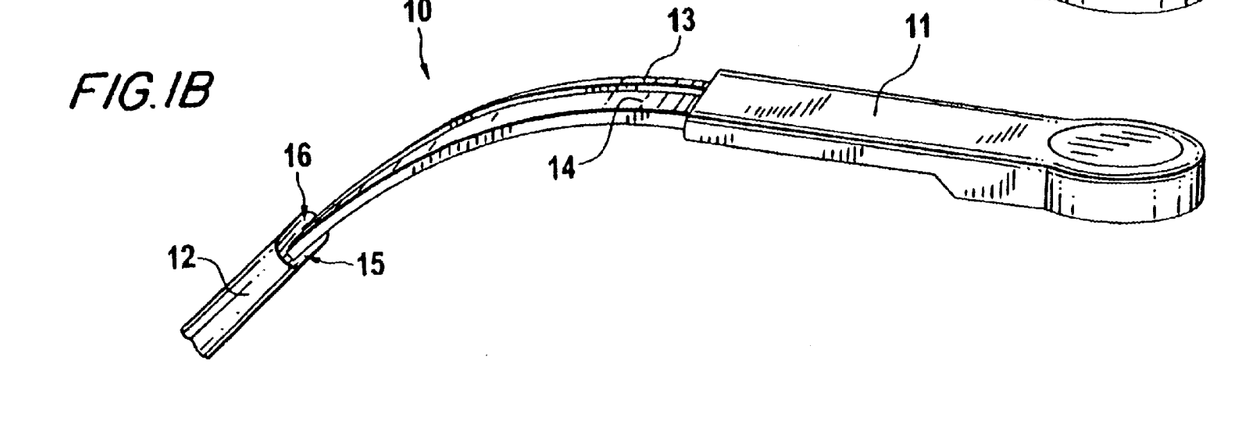
FIG. 1B shows a perspective view of the wiper arm of FIG. 1A in the state of being folded in on the windshield.
Figure 1C:
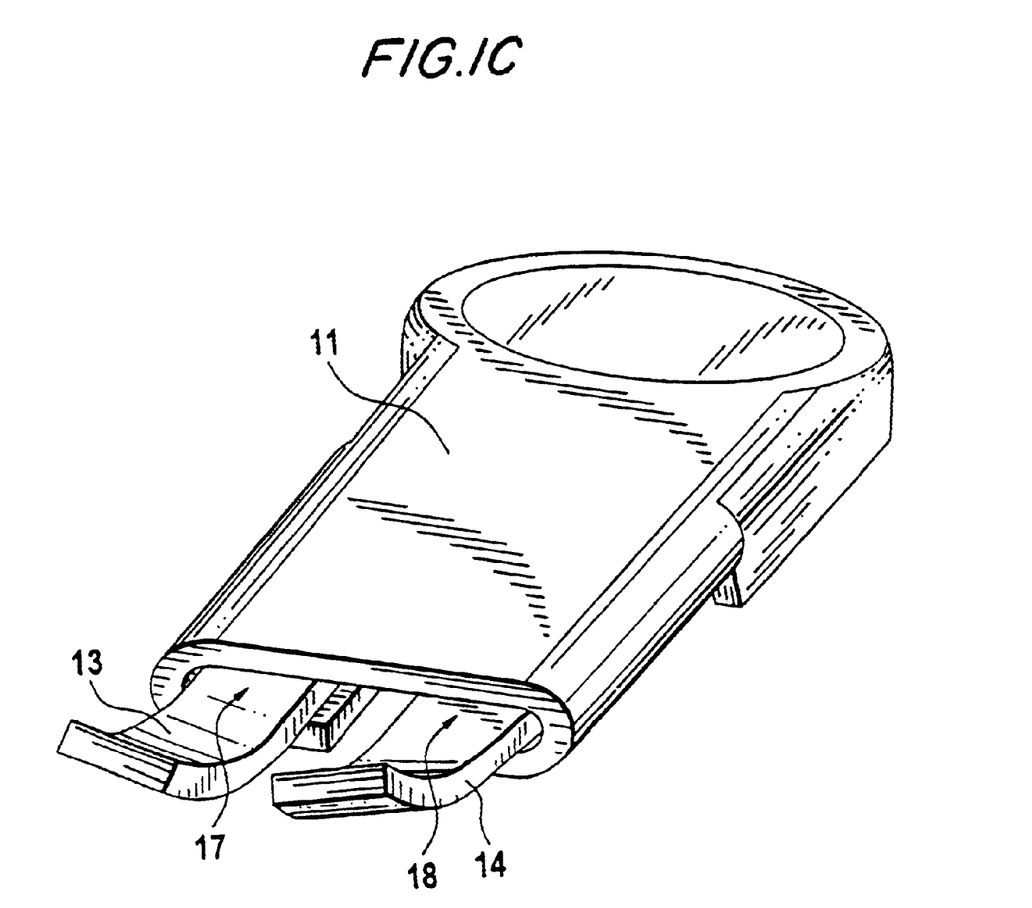
FIG. 1C shows a perspective sectional view through the wiper arm of FIG. 1A.
Figure 3A:
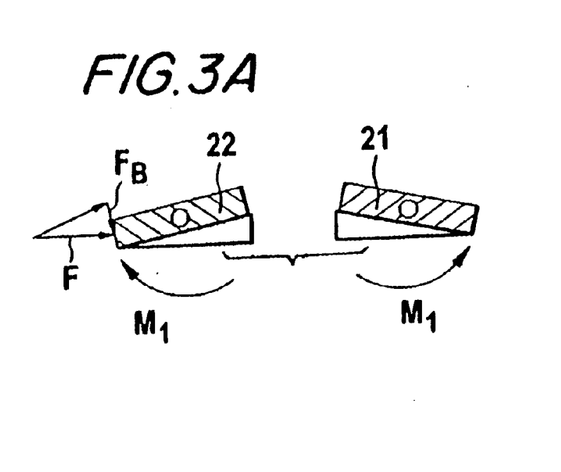
FIG. 3A is a cross section through the torsion spring element of the spring element of FIG. 2C in the state of being folded in onto the windshield.
Figure 3B:
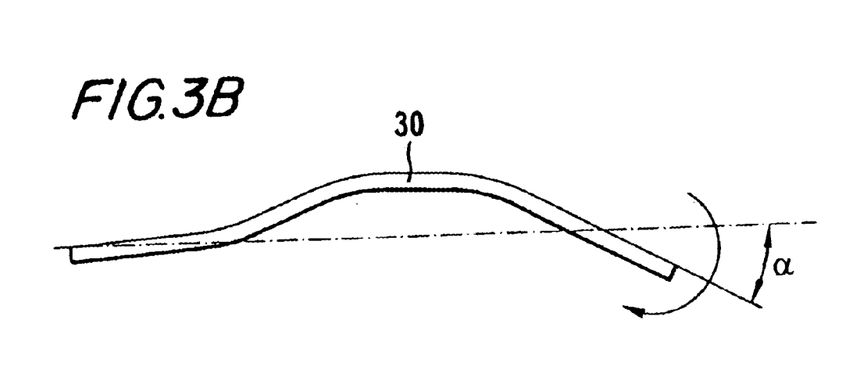
FIG. 3B is a longitudinal section through the spring element of FIG. 2C in the state of being folded in on the windshield.
Figure 3C:
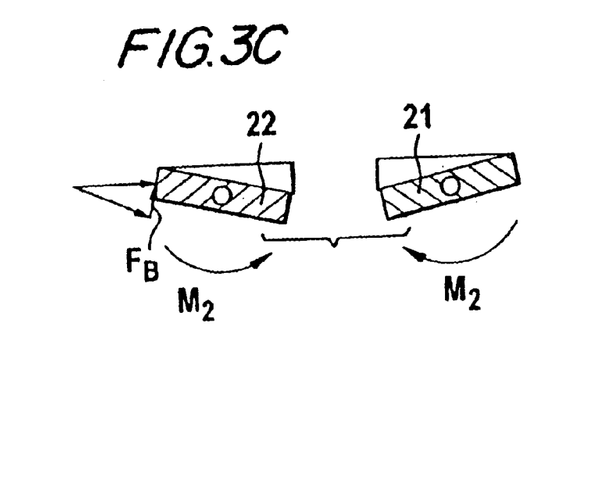
FIG. 3C is a cross sectional view through the torsion spring element of FIG. 2C in the state of being folded out and away from the windshield.

FIG. 1A shows a wipe arm 10 in a state of being folded out and away from the windshield, whereby the windshield is not specifically illustrated here. The wiper arm 10 has a region 11 facing a drive (not shown) and a region 12 facing a wiper blade (also not shown). Between the regions 11 and 12, two, spaced-apart torsion spring elements 13 are located. The torsion spring elements 13 have opposed torsion angles, so that the torsion spring elements 13 are rotated about their longitudinal axes (see FIG. 1C). By means of the two opposed torsion angles of the torsion spring elements 13, the torsion spring elements 13 experience a bending moment in their longitudinal direction, so that the wiper arm 10 obtains the longitudinal bend or curve illustrated in FIG. 1A or FIG. 1B. If one folds the wiper arm 10 that is folded out and away from the windshield (see FIG. 1A) against the windshield (see FIG. 1B), the opposed torsion angles of the torsion spring elements 13 and 14 are transposed, that is, the torsion spring element 13 has the same torsion angle in the folded-out state away from the window as the torsion spring element 14 in the folded-in state on the window, and vise versa (see FIGS. 3A and 3C). The torsion spring elements 13 and 14 are inserted in the regions 11 and 12. For this purpose, the regions 11 and 12 have openings 15, 16, 17 and 18 (see FIGS. 1B and 1C). By means of clip connections (not shown), the torsion spring elements 13 and 14 are prevented from slipping out from the regions 11 and 12.

Figure 2A:
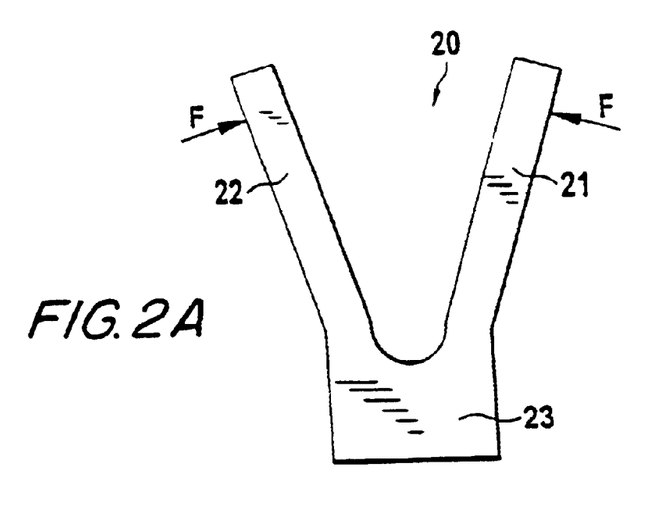
FIG. 2A shows a plan view of a stamped-out spring element.
Figure 2B:
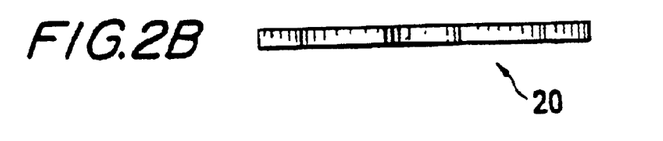
FIG. 2B shows a front view of the spring element of FIG. 2A.
Figure 2C:
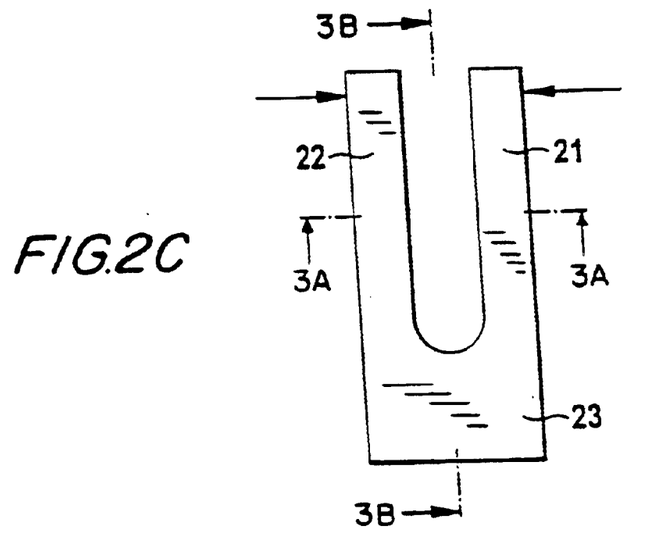
FIG. 2C is a plan view of the spring element of FIG. 2A with torsion spring elements pressed against one another.
Figure 2D:
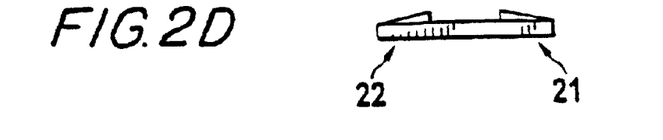
FIG. 2D is a front view of the spring element of FIG. 2C.
Figure 3D:
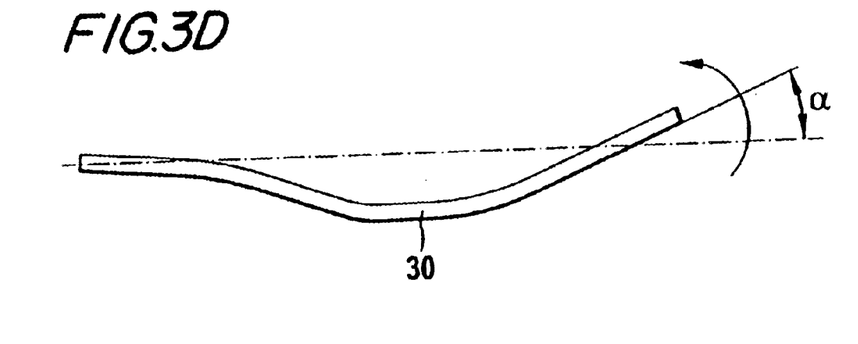
FIG. 3D is a longitudinal section through the spring element of FIG. 2C in the state of being folded out and away from the windshield.

FIG. 2A shows a spring element 20 with torsion spring elements 21 and 22, which are connected to one another by means of a connecting element 23. If the torsion spring elements 21 and 22 are pressed together by a force F (see FIG. 2C), then the torsion spring elements arc. (see FIGS. 2D, 3A and 3C). The torsion of the torsion spring elements 21 and 22 therefore results in the torsion spring elements 21 and 22 having a square cross section (FIG. 3A), whose width is greater than its thickness. Therefore, the torsion spring elements have a smaller resistance moment in the thickness direction than in the direction of their width, so that the force F deforms the torsion spring elements 21 and 22 from their non-arced position, which upon engagement of the force F is unstable, into the arced position. Based on the torsion deformation of the torsion spring elements 21 and 22, the torsion spring elements 21 and 22 experience a bending or curving in the longitudinal direction (FIGS. 3B, 3D) by means of a force component $F_B$ acting perpendicularly on the torsion spring elements 21 and 22. If the wiper arm that is folded in against the windshield (FIG. 3B) is folded out and away from the windshield (FIG. 3D), then the torsion angle of the torsion spring elements 21 and 22 are interchanged against one another (see FIGS. 3A and 3C), so that the force component $F_B$ acting perpendicularly on the torsion spring elements 21 and 22 now bend the wiper arm 30 in its longitudinal direction upwardly, and this position folded out and away form the windshield can be stably maintained. The larger the force component $F_B$ is, the more rigidly will the wiper arm 30 be pressed against the windshield, whereby the wiper performance of the windshield wiper device is increased. The greater the force component $F_B$ is, also the more stable the wiper arm 30 will be held in its position folded out and away from the windshield.

Figure 4A:
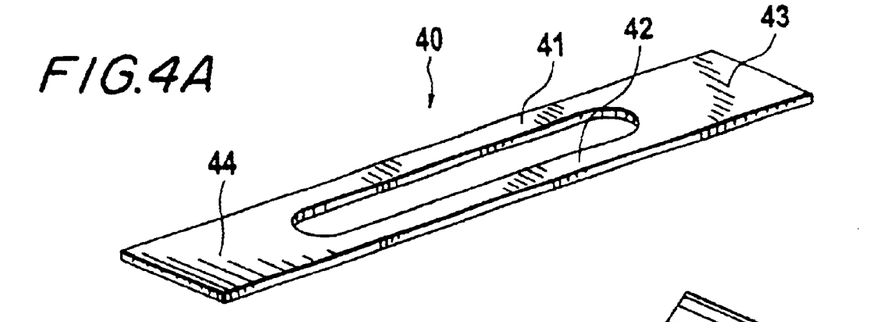
FIG. 4A is a perspective view on a second embodiment of a spring element.
Figure 4B:
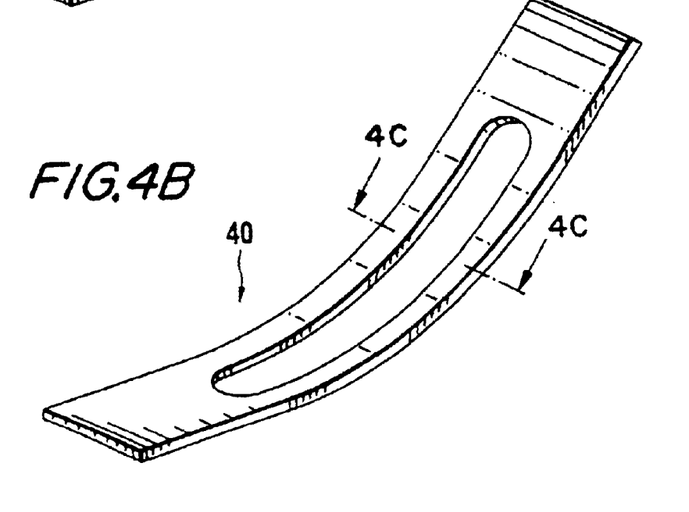
FIG. 4B is a perspective view of spring element of FIG. 4A provided with a longitudinal curve.
Figure 4C:
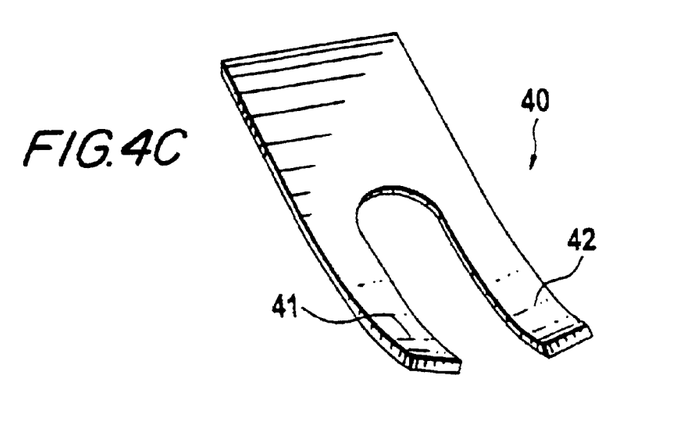
FIG. 4C is a perspective sectional view through the spring element illustrated in FIG. 4B.

FIG. 4A shows a spring element 40 with two torsion spring elements 41 and 42, which on their end regions are connected to one another by means of connecting elements 43 and 44. The spring element 40 can be made very simply as a stamped curved part. In a manufacturing process, the torsion spring elements 41 and 42 are arced about their longitudinal axes about the opposed torsion angles after stamping out of the spring element 40 (FIG. 4C) and the spring element 40 is bent along its length (FIG. 4B).

Figure 5A:
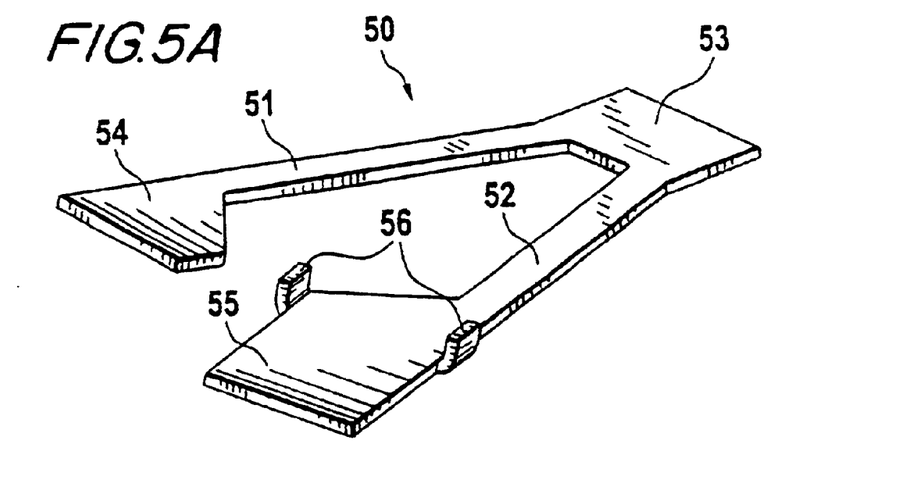
FIG. 5A is a perspective view on a third embodiment of a spring element.
Figure 5B:
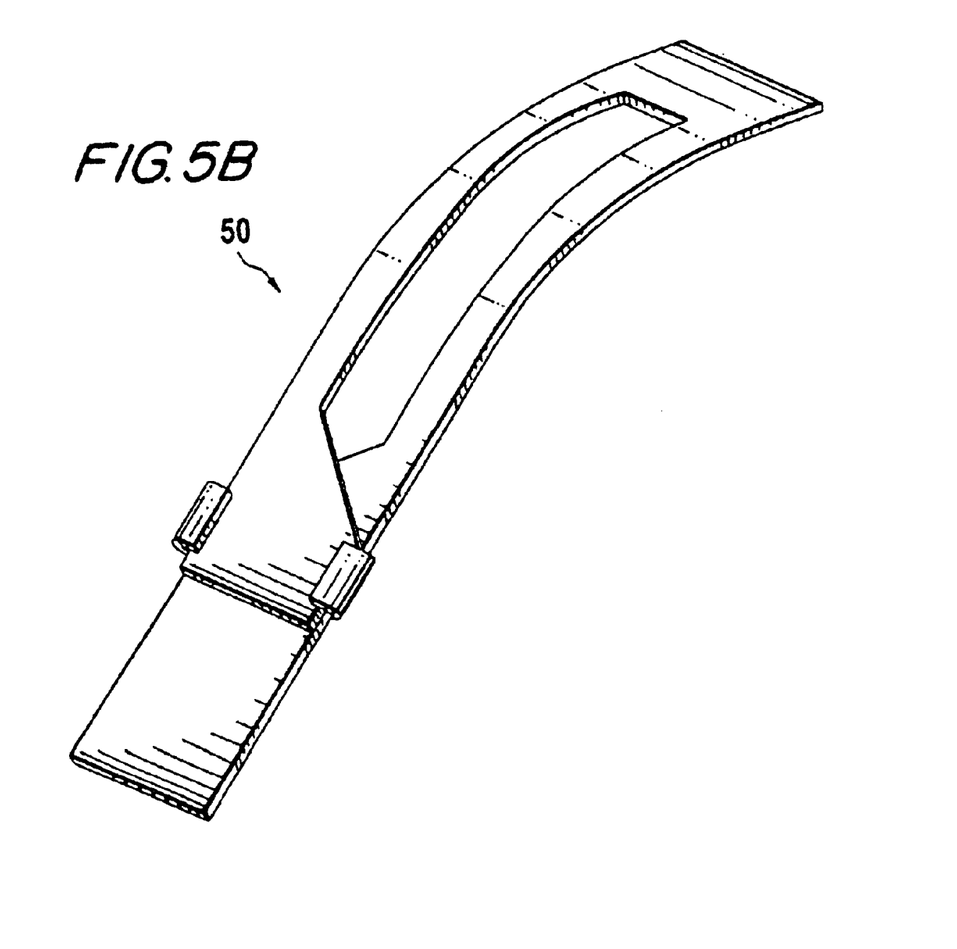
FIG. 5B is a perspective view of the spring element of FIG. 5A provided with a longitudinal curve.

FIG. 5A shows a spring element 50 with torsion spring elements 51 and 52. The torsion spring elements 51 and 52 are connected to one another at their regions in a V-shape by means of a connecting element 53. The torsion spring element 51 is connected on its other end with a connecting element part 54 and the torsion spring element 52 is connected on its other end with a connecting element part 55. The connecting element part 55 has hook elements 56, so that after pressing-together of the torsion spring elements 51 and 52, the connecting element part 54 can be hung in the connecting element part 55, whereby the existing torsion of the torsion spring elements 51 and 52, produced by pressing together of the torsion spring elements 51 and 52 and the resulting longitudinal bending of the spring element 50 is maintained (see FIG. 5B).

Figure 6A:
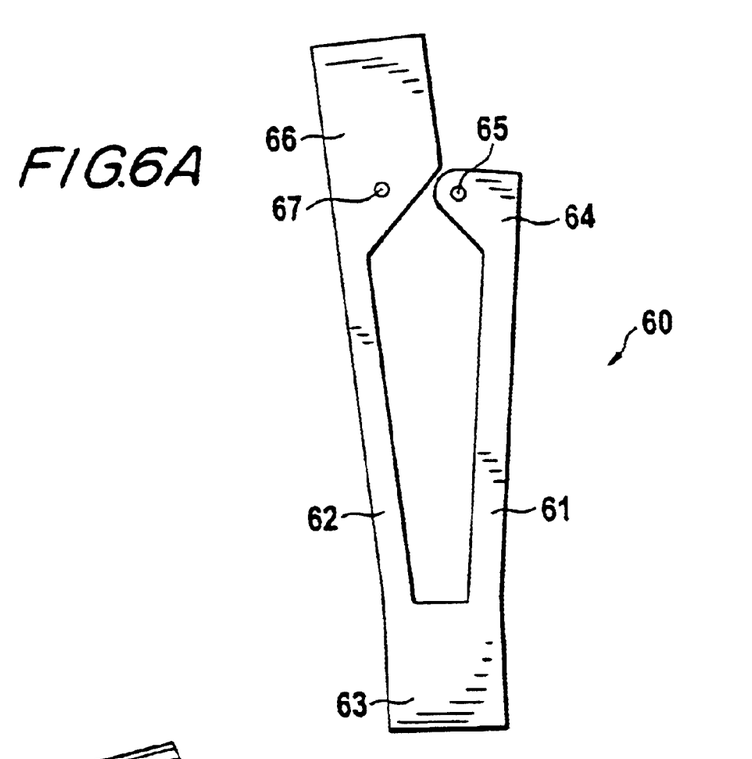
FIG. 6A is a plan view of a fourth embodiment of a spring element.
Figure 6B:
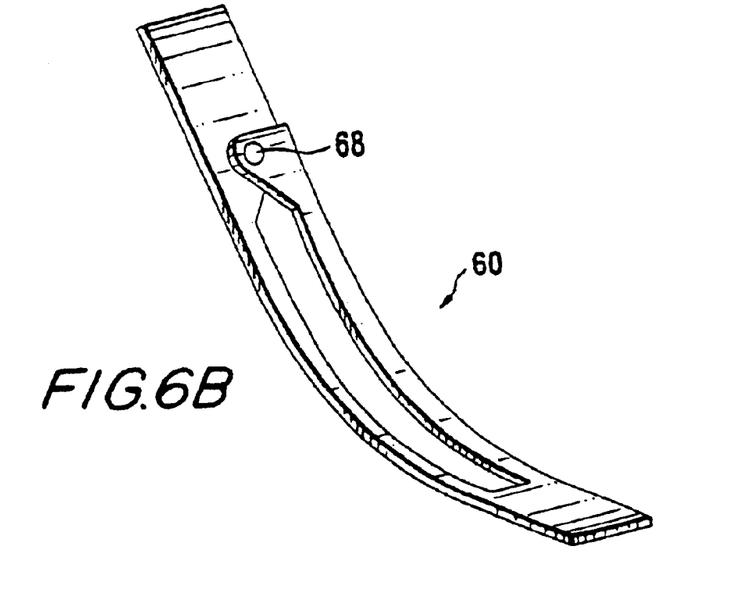
FIG. 6B is a perspective view of the longitudinally curved spring element of FIG. 6A.

FIG. 6A shows a spring element 60 with torsion spring elements 61 and 62, which are connected on their end regions in a V-shape with a connecting element 63. The torsion spring element 51 has a connecting element part 64 on its other end region, which is provided with a hole 65. The torsion spring element 62 has a connecting element part 66 on its other end, which is connected with a hole 67. By pressing-together of the torsion spring elements 61 and 62, the holes 65 and 67 can be brought to cover or overlap, so that a connecting means 68, for example, a rivet, a screw, or another type of attachment means know to the practitioner can be inserted through the overlapping holes 65 and 67. In this manner, the torsion of the torsion spring elements 61 and 62 produced by pressing together the torsion spring elements 61 and 62 and the resulting longitudinal bending of the spring element 60 is retained (see FIG. 6B).

Figure 7A:
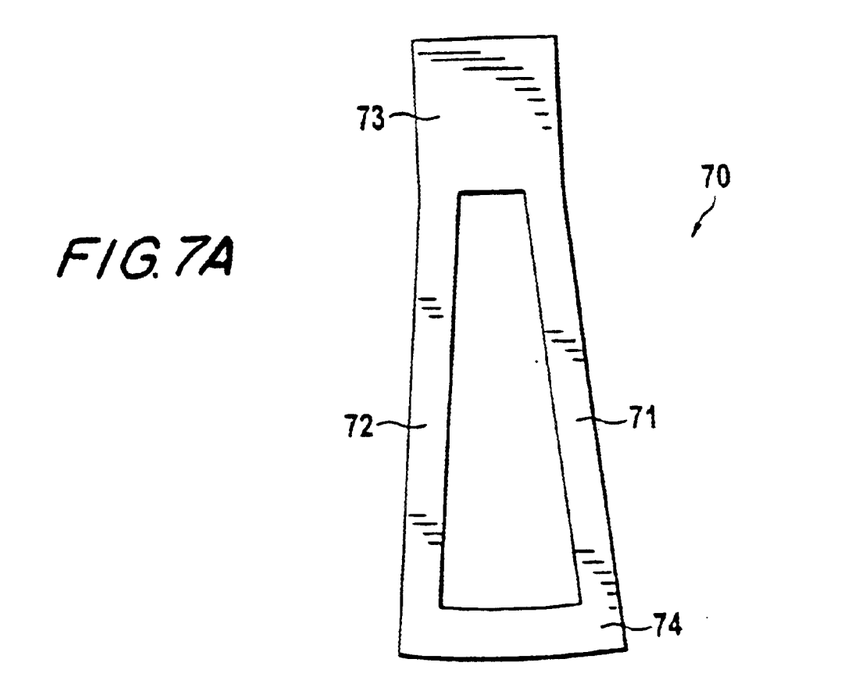
FIG. 7A is a plan view of a fifth embodiment of a spring element.
Figure 7B:
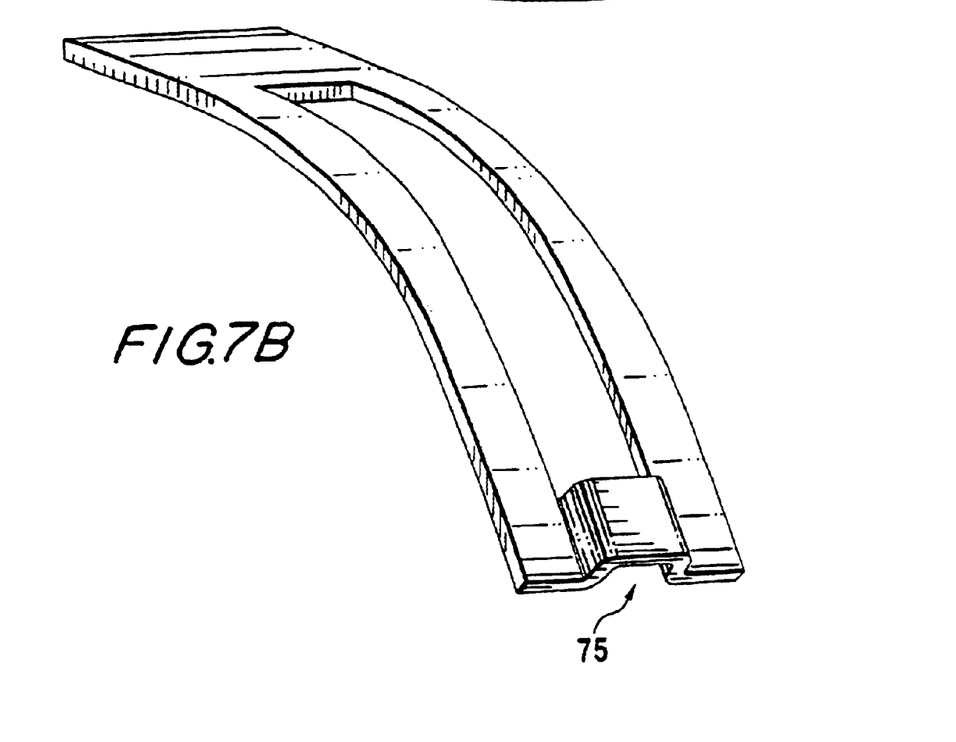
FIG. 7B is a perspective view of the longitudinally curved spring element of FIG. 7A.

FIG. 7A shows a spring element 70 with two torsion spring elements 71 and 72, which are connected to one another by means of connecting elements 73 and 74. The connecting element 74 is provided in its center region with a shoulder 75 (FIG. 7B) in the manufacture of the spring element 70, whereby the V-shaped torsion spring elements 71 and 72 arranged on the connecting element 73 are pressed against one another, so that the torsion spring elements 71 and 72 experience torsion and the spring element 70 is bent in its longitudinal direction (FIG. 7B). Since the spring element 70 can be made cost-effectively as a stamped metal part, the shoulder 75 likewise can be produced in a stamping mechanism, whereby the manufacture of the spring element 70 is substantially simplified.

It will be understood that each of the elements described above, or two or more together, may also find a useful application in other types of constructions differing from the types described above.

While the invention has been illustrated and described herein as a windshield wiper device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper device, comprising:
a wiper arm (10, 30) that is drivable by means of a drive, wherein said wiper arm (10, 30) is able to be folded against a windshield and is able to be folded away from the windshield, wherein a wiper blade is arranged on the wiper arm, wherein the wiper arm (10, 30) has a first region (11) that faces the drive and a second region (12) that faces the wiper blade,
wherein the first region (11) of the wiper arm (10, 30) facing the drive and the second region (12) of the wiper arm (10, 30) facing the wiper blade are connected with two torsion spring elements (13, 14, 21, 22, 41, 42, 51, 52, 61, 62, 71, 72), and wherein the torsion spring elements are inserted in the first region (11) and second region (11) of the wiper arm (10, 30), whereby the torsion spring elements (13, 14, 21, 22, 41, 42, 51, 52, 61, 62, 71, 72) are provided with torsion angles that are opposed to one another and the torsion spring elements (13, 14, 21, 22, 41, 42, 51, 52, 61, 62, 71, 72) have a rectangular cross section, whose width is greater than its thickness, so that the torsion spring elements (13, 14, 21, 22, 41, 42, 51, 52, 61, 62, 71, 72) are curved in toward the windshield or curved away from the windshield, wherein one connecting element (53, 63) is formed in one piece and another connecting element is formed in two pieces, and wherein, in a pre-assembled state, the two torsion spring elements (51, 52, 61, 62) are arranged with a first end in a V-shape at the one-piece connecting element (53, 63) and wherein a part (54, 55, 54, 66) of the two-piece connecting element is mounted on a second end of the torsion spring elements (51, 52, 61, 62).

2. The windshield wiper device according to claim 1, wherein the two torsion spring elements (13, 14, 21, 22, 41, 42, 51, 52, 61, 62, 71, 72) are spaced apart from one another.

3. The windshield wiper device according to claim 1, wherein the two torsion spring elements (13, 14, 21, 22, 41, 42, 51, 52, 61, 62, 71, 72) are connected to one another at end regions, respectively, by means of the connecting elements (23, 43, 44, 53, 54, 55, 63, 64, 66, 73, 74), so that the torsion spring elements (13, 14, 21, 22, 41, 42, 51, 52, 61, 62, 71, 72) and the connection elements (23, 43, 44, 53, 54, 55, 63, 64, 66, 73, 74) form a single spring element (20, 40, 50, 60, 70).

4. The windshield wiper device according to claim 3, wherein one of the connecting elements (74) is provided in a central region with a shoulder.

5. The windshield wiper device according to claim 3, wherein the single spring element (40) is formed as a longitudinally curved component with the torsion spring elements (41, 42) arced around its longitudinal axis.

6. The windshield wiper device according to claim 3, wherein the torsion spring elements (13, 14) or the single spring element (20, 40, 50, 60, 70) are formed as a stamped metal part.

7. The windshield wiper device according to claim 3, wherein the torsion spring elements (13, 14) or the single spring element (20, 40, 50, 60, 70) are formed as a fiber-reinforced plastic part.

8. The windshield wiper device according to claim 1, wherein the two-piece connecting element has attachment means (56, 58), in order to hold together the ends of the torsion spring elements (51, 52, 61, 62) running in the V-shape from one another, to press the torsion spring elements against one another.

9. A windshield wiper device, in particular for a motor vehicle, with a wiper arm (10, 30) that is drivable by means of a drive, wherein said wiper arm (10, 30) is able to be folded again a windshield and is able to be folded away from the windshield, wherein a wiper blade is arranged on the wiper arm, wherein the wiper arm (10, 30) has a first region (11) that faces the drive and a second region (12) that faces the wiper blade, characterized in that the first region (11) of the wiper arm (10, 30) facing the drive and the second region (12) of the wiper arm (10, 30) facing the wiper blade are connected with two torsion spring elements (13, 14, 21, 22, 41, 42, 51, 52, 61, 62, 71, 72), whereby the torsion spring elements (13, 14, 21, 22, 41, 42, 51, 52, 61, 62, 71, 72) are provided with torsion angles that are opposed to one another and the torsion spring elements (13, 14, 21, 22, 41, 42, 51,

52, 61, 62, 71, 72) have a rectangular cross section, whose width is greater than its thickness, so that the torsion spring elements (13, 14, 21, 22, 41, 42, 51, 52, 61, 62, 71, 72) are curved in toward the windshield or curved away from the windshield, wherein the first region (11) of the wiper arm (10) facing toward the drive and the second region (12) of the wiper arm (10) facing toward the wiper blade each have an opening for receiving a single spring element (20, 40, 50, 60, 70) which includes the torsion spring elements or each of the first and second regions (11, 12) is provided with two openings (15, 16, 17, 18) for receiving the two torsion spring elements (13, 14).

10. The windshield wiper device according to claim 9, wherein the spring element (20, 40, 50, 60, 70) or the torsion spring elements (13, 14) are clippable in the first region (11) facing toward the drive and/or in the second region (12) facing toward the wiper blade.

* * * * *